March 1, 1949. J. F. SPIELMAN 2,462,915
AUTOMATIC FOLLOW-UP REVERSIBLE HYDRAULIC SELECTOR
VALVE AND ASSEMBLY INCLUDING SAME
Filed April 28, 1947 3 Sheets-Sheet 1
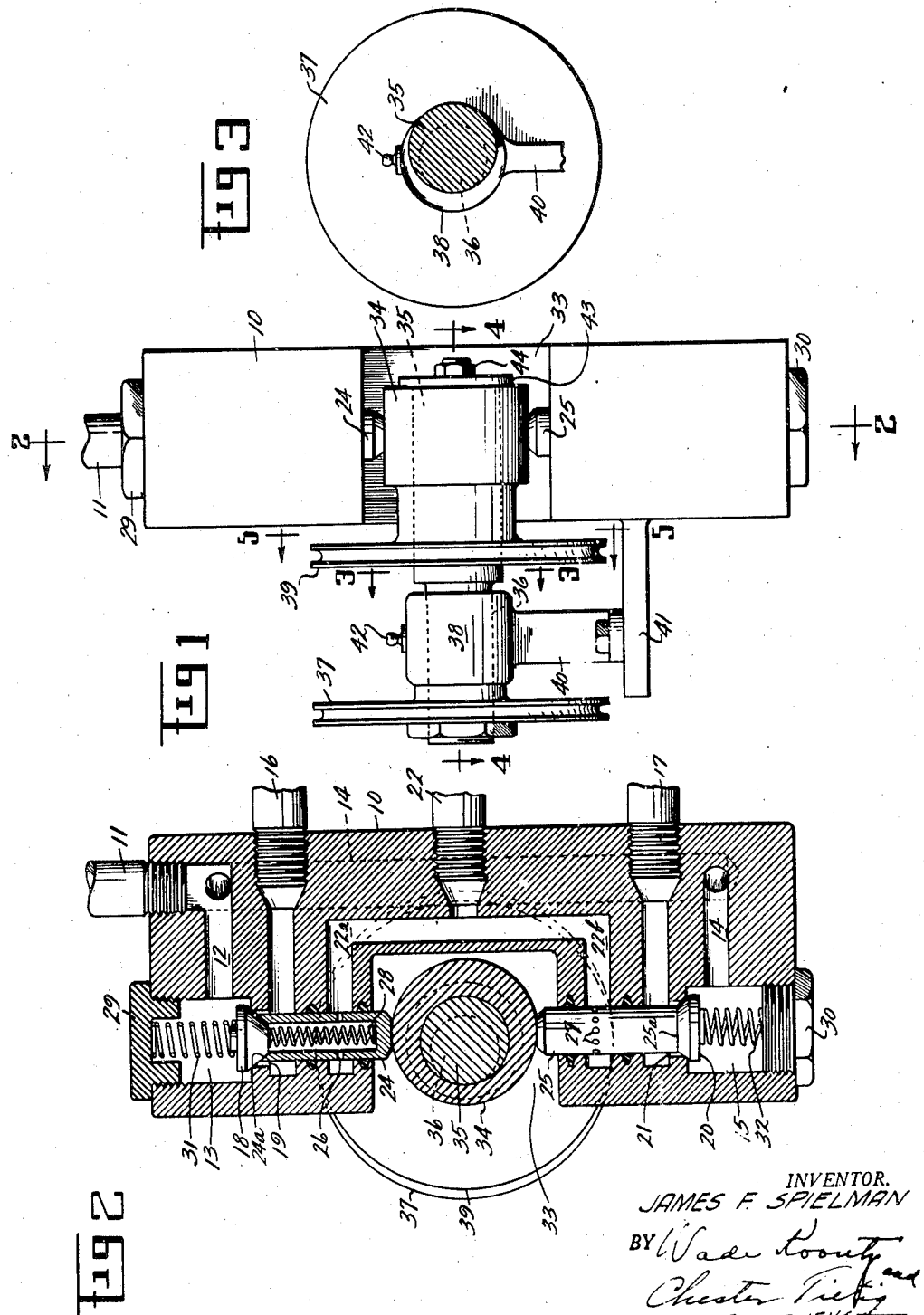
INVENTOR.
JAMES F. SPIELMAN
BY Wade Koontz
Chester Tietig
HIS ATTORNEYS

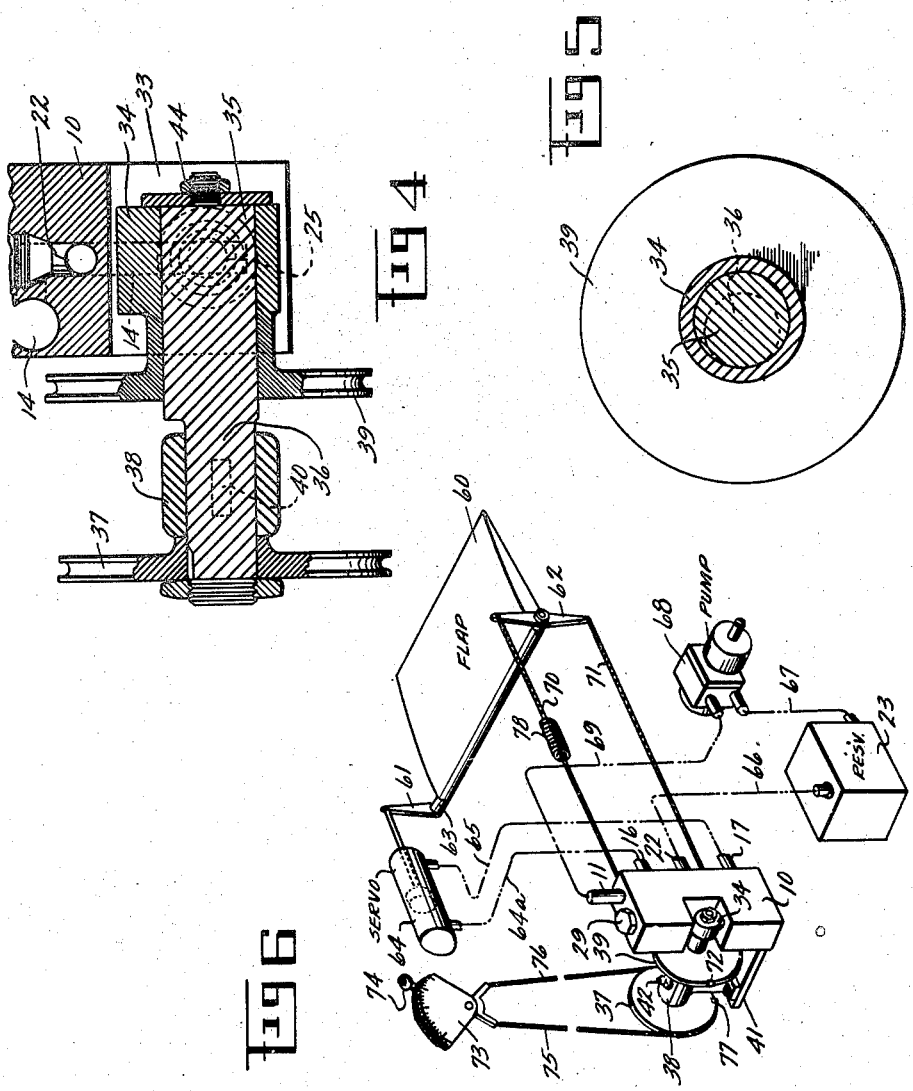

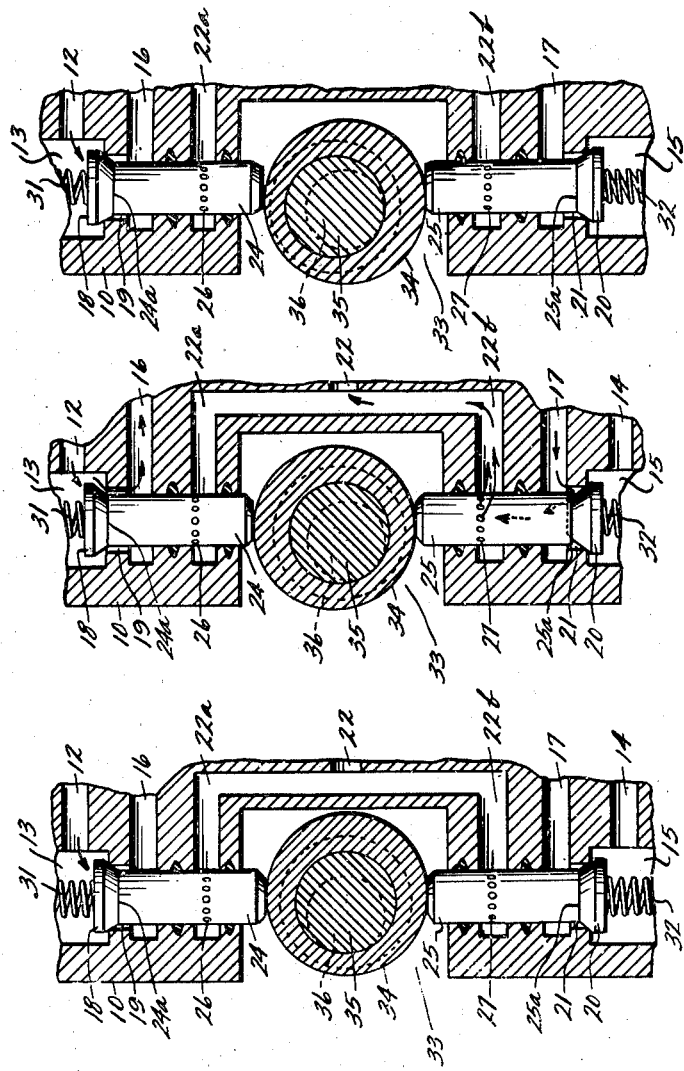

Patented Mar. 1, 1949

2,462,915

UNITED STATES PATENT OFFICE 2,462,915

AUTOMATIC FOLLOW-UP REVERSIBLE HYDRAULIC SELECTOR VALVE AND ASSEMBLY INCLUDING SAME

James F. Spielman, Torrington, Conn.

Application April 28, 1947, Serial No. 744,415

17 Claims. (Cl. 121—41)

(Granted under the act of March 3, 1883, as amended April 30, 1928; 370 O. G. 757)

The invention described herein may be manufactured and used by or for the Government for governmental purposes without payment to me of any royalty thereon.

This invention relates to a hydraulic valve of the poppet type which is especially useful to control the wing flaps of aircraft.

Conventional flap control valves at the present time permit operation of the valve only in extreme fixed positions. This is also true of the conventional flap controls.

One object of the invention is to provide a flap control that permits pre-selection of the amount of flap movement which is to be accomplished, followed by automatic cut off of the hydraulic power after the desired flap position has been attained.

Another object is to provide an apparatus permitting stepless adjustment of the flaps.

Another object is to provide a compact valve which is especially adapted to handle high fluid pressures satisfactorily for use in aircraft.

Another object is to provide a valve which is unusually responsive to manual control.

In the drawings:

Fig. 1 is a side elevation of the valve and the controlling pulleys therefor;

Fig. 2 is a vertical section of the valve taken on the line 2—2 of Fig. 1;

Fig. 3 is a vertical section of the eccentric crank taken on the line 3—3 of Fig. 1;

Fig. 4 is a longitudinal section of the eccentrics and operating pulleys thereof taken on the line 4—4 of Fig. 1;

Fig. 5 is a cross section of the eccentrics taken on the line 5—5 of Fig. 1;

Fig. 6 is an oblique view of the valve, the flap and the arrangement of controls between them; and Figs. 7, 8 and 9 are fragmentary views, partly diagrammatic, of the various eccentric positions and the valve positions caused by them and are taken on the line 2—2 of Fig. 1.

In Figs. 1 and 2, 10 is a block which may be supplied with a hydraulic fluid (not shown) through an inlet 11. A high pressure passage 12 leads to a valve chamber 13, another high pressure passage 14 (shown in dotted lines in Fig. 2) leads to a valve chamber 15 disposed oppositely to chamber 13.

A pair of outlet passages 16 and 17 lie parallel with and adjacent to that part of the high pressure passages 12 and 14 which lead directly to the valve chambers 13 and 14. A poppet valve 18 in chamber 13 is adapted to seal a passage 19 between the chamber 13 and passage 16. In chamber 15 a poppet valve 20 similar to valve 18 seals the passage 21 between the chamber 15 and the outlet passage 17. The function of valves 18 and 20 is therefore to shut off the flow of high pressure fluid from the outlet working passages 16 and 17 at the desired time.

A common drain passage 22 having two conduits 22a and 22b is adapted to drain hydraulic fluid to a reservoir 23 (see Fig. 6). Hydraulic fluid pressure may at certain times be delivered to passages 22a and 22b through a pair of sleeves 24 and 25 which are oppositely disposed in chambers 13 and 15 respectively. The outer ends of the sleeves are closed, but their upper ends are beveled to fit the poppet valves 18 and 20 with fluid tight seats 24a and 25a respectively. Where the sleeves 24 and 25 extend through drain passages 22a and 22b, the sleeves are provided with rings of accurately drilled ports 26 and 27 respectively.

Each sleeve contains a coil spring 28 which is normally in compression and pushes against poppet valve 18 or 20 to separate the sleeve from the valve. Between each poppet valve 18 and 20 and adjustable chamber caps 29 and 30 respectively, there is a coil spring 31 and 32. The springs 31 and 32 are normally in compression to hold valves 18 and 20 to their seats 19 and 21 respectively, said springs 31 and 32 being substantially greater in pressure than spring 28 to overcome the effects of spring 28.

The sleeves 24 and 25 thus each project past one drainage passage and one high pressure outlet passage. They also project into an approximately cubical opening 33 in one of the longer sides of the block 10. Such opening 33 is partially occupied by a pair of eccentrics 34 and 35, an outer one and an inner one respectively. Eccentric 35 is also eccentric to the shaft 36 with which it is integral. A pulley 37 is mounted concentrically with shaft 36 which latter is supported by means of a hub 38, while a pulley 39 is mounted concentrically with the eccentric extension 35 of shaft 36 (see Fig. 4). Hub 38 supports shaft 36 by means of a stand 40. Pulley 39 is loose on eccentric 35 but tight to eccentric 34. Since the mounting hole in pulley 39 is sufficiently eccentric to its circumference to correct the eccentricity of its shaft, the pulleys 37 and 39 have little or no eccentricity of rotation relative to each other.

It is intended that the control pulleys 37 and 39 shall at all times regulate the internal workings of the hydraulic valve, therefore a support 41 is provided which extends from the side of the block 10 as seen in Fig. 1. It supports the stand 40 by which the pulleys and their associated eccentrics are supported. A grease fitting 42 is preferably provided to lubricate the rotation of shaft 36 in hub 38. A plate 43 and a nut 44 are provided at the right hand end of eccentrics 34 and 35 to hold them together.

Referring now to Fig. 6, the general scheme of operation of the valve and the controls is illustrated. Following an explanation of the objects to be accomplished, the internal operation of the hydraulic valve will be set forth.

In Fig. 6, the member to be controlled is a wing flap 60. The flap is provided with a single bell crank 61 on its left hand side and a double bell crank 62 on its right hand side. The two cranks 61—62 are rigidly connected by a shaft 63. A servo hydraulic cylinder or motor 64 is arranged to actuate the flap 60 by bell crank 61. High pressure hydraulic lines 64a and 65 connect the servo cylinder 64 with ports 16 and 17. A drain line 66 connects port 22 with the reservoir 23. A suction line 67 connects reservoir 23 with a high pressure pump 68 which is provided with a relief valve (not shown). A high pressure line 69 delivers hydraulic fluid pressure to the port 11.

From the bell crank 62 a pair of cables 70 and 71 pass over pulley 39 in opposite directions and are anchored to that pulley at point 72. A tension spring 78 of strength equal to required cable tension is provided in cable 70 to take care of inequalities of relative motion of the cables. 73 is a control quadrant having an operating handle 74. The latter controls the angular position of pulley 37 by means of a cable 75 and 76 which is anchored to pulley 37 at point 77.

To operate the flap, the quadrant operating handle is first pushed to that position indicative of the desired final position of the flap, say all the way down. The starting position is assumed to be on the right, as shown. In this position, Fig. 7 shows the internal condition of the valve. Hydraulic fluid under pressure entering the ports 13 and 15 exerts its force against the poppet valves 18 and 20 respectively. In Fig. 7, the eccentrics 34 and 35 are shown in such a position that the valves 18 and 20 are both seated permitting no flow of fluid to or from the servomotor cylinder 64, hence the flaps are held in the horizontal or beginning of traverse position.

The operating handle is therefore pushed all the way to the left from the position shown in Fig. 6. Pulley 37 is therefore rotated counterclockwise, thus rotating shaft 36 and eccentric 35. Due to rotation of eccentric 35, pulley 39 and cam 34 are moved farther from the flap 60, thereby causing the spring 78 in cable 70 to stretch. Since no spring is installed in cable 71, the pulley is caused to also rotate in a counterclockwise direction bringing the cam 34, poppet valve 18 and sleeve 24 to the condition shown in Fig. 8. As seen in Fig. 8, rotation of the eccentrics causes the high part of the outer eccentric 34 acting like a cam to lift sleeve 24 and poppet valve 18 off its seat permitting the flow of high pressure fluid from upper chamber 13 through passage 19 to the motor port passage 16 from whence the fluid flows via conduit 64a (Fig. 6) to the servo cylinder 64 moving the piston therein to the right from the position as seen in Fig. 6 initiating downward movement of the flap.

Movement of the piston in the servo cylinder causes return flow of fluid through the passage 17 as indicated by the arrows in Fig. 8. It will be observed by reference to this figure that in shifting the outer eccentric 34 from the position shown in Fig. 7, the sleeve 25 due to the loading of its internal spring is moved to contact the low side of the eccentric and accordingly the sleeve lifts from seating engagement with the underside of the lower poppet valve 20. Return flow fluid from passage 17 may then pass through the hollow sleeve 25 and ports 27 to the drain passages 22b and 22 for return to the reservoir.

The outer eccentric 34 rotates as the flaps 60 go down, changing also the position of the outer eccentric 34 by pulling the cable 70 to turn pulley 39 in a clockwise direction. The combination of the two motions causes a decrease in the radial distances of the combined eccentrics in relation to the sleeves 24 and an increase in regard to eccentric 35. The sleeve 24 then follows the eccentrics in that it comes closer to the eccentric's center and the poppet valve 18 then seats. Sleeve 25 on the other hand is pushed further away from the eccentric's center, thereby closing the seat 25a and shutting off return fluid flow through the sleeve 25. After the flaps are fully down, the valve assumes the setting shown in Fig. 9. In this position, motion of the flaps is again cut off because there is no fluid flow through the valve. Figs. 7 and 9 are identical except for the positions of the eccentrics 35 and 36.

In the case that both poppet valves 18 and 20 are closed and the system tends to build up high pressure, the system relieves itself through the pump relief valve (not shown).

It will be apparent that the amount the inlet valve 18 and exhaust through sleeve 25 open is a function of the amount of displacement of outer eccentric 34 from its position as shown in Fig. 7 and similarly the required follow-up movement of the inner eccentric 35 is proportional to the displacement of the servomotor piston so that the flap displacement from the neutral position is dependent on the amount of the displacement of control element 60 (Fig. 6) from the neutral position so that any desired flap setting between neutral and full down may be obtained.

The operation described constitutes the motions necessary to push the flaps down. It may be seen from an inspection of the drawings that for a return movement of the flaps to the neutral position shown, the cycle of motions need only be reversed. The rate of movement of the flap 60 can be controlled by either varying the total area of the holes 26 and 27 in sleeves 24 and 25, or by varying the viscosity of the hydraulic fluid or the speed of the pump 68 or combinations thereof.

Numerous changes may be made in the valve and in its application to flap control or other instrumentalities without departing from the spirit of the invention as defined by the appended claims.

The invention claimed is:

1. In combination, a hydraulic valve, means comprising a pair of eccentrics on said valve, one eccentric being revoluble within the other for regulating the amount of high-pressure fluid which may pass through said valve during a single cycle thereof, a pulley attached to the side of each eccentric to rotate therewith, one pulley and one eccentric controlling fluid metering means within said valve, the other pulley and the other eccentric being controlled by a load member which is to be hydraulically moved, whereby when the second pulley and second eccentric again coincide with the point to which the first pulley and eccentric was set, a cycle is completed and the valve de-actuated.

2. In a hydraulic valve, a body, a pair of oppositely disposed passages therein for the ingress of high-pressure fluid, a pair of parallel passages therein for the egress of high pressure fluid, a common drain passage, a pair of valves of the poppet type for controlling the flow of high pressure fluid from said ingress passages to said egress passages, a pair of oppositely disposed sleeves adapted to contact said poppet valves with an inner open sleeve end, said sleeves being perforated in a zone substantially intermediate of their ends, and means comprising a pair of eccentrics, the inner one being rotatable within the outer one to change the amount of throw of the latter, said eccentrics governing the amount of movement of said sleeves whereby to regulate the degree of movement of said valves before pressure relief to the drain passage takes place through the sleeve perforations.

3. In a hydraulic valve, dual means for receiving fluid at high pressure, dual means for delivering fluid of high pressure, a common drain passage for fluid at atmospheric pressure, means for sealing flow from the first named passages to the second named passages, means for opening said sealing means, said means comprising a pair of slidable sleeves perforated substantially intermediate of their ends, said sleeves being slidably disposed across said second named means to open said sealing means, adjustable means for regulating the limits of travel of said sleeves whereby the amount of fluid passed by the opening of said sealing means may be preselected, said means comprising a pair of inner and outer eccentrics, the inner one being revoluble in the outer one, the latter being in contact with the outer ends of said sleeves, a pulley attached to the side of each eccentric, a driving connection between one eccentric and the object to be hydraulically actuated, said driving means acting to bring the eccentric back to its original position whereby to deactivate the valve.

4. A hydraulic valve comprising a generally oblong block having an open space of substantial size in the middle of one of its longer sides, a pair of eccentrics positioned one inside the other and located to operate crosswise of said open space, operating valves extending into said open space from the top and bottom thereof, said valves comprising a pair of sleeves, said sleeves having closed ends in contact with the outer one of said eccentrics, a pair of pulleys, a mounting for said pulleys, an extension from said block supporting said mounting, each of said pulleys operatively connected to one of said eccentrics so that the inner eccentric may be rotated inside the outer eccentric whereby to regulate the degree of projection of said valves from said block and operating passages within said block regulatable by the longitudinal position of said valves.

5. In a hydraulic valve, a body, an inlet for high pressure fluid therethrough, a pair of passages from said inlet, a pair of valve chambers to which said passages are connected, said valve chambers being on opposite sides of an opening in said block, a pair of eccentrics mounted in said opening, one eccentric being rotatable within the other, a pair of perforated sleeves, each sleeve having an outer end which is normally in contact with the outer of said eccentrics, and said sleeves being slidable in opposite directions by said eccentric, a poppet valve for each eccentric, said poppet valves being disposed oppositely to each other, a fluid pressure outlet controlled by each poppet valve, a drain passage from each pressure-fluid egress-passage, said drain passage being under the control of said sleeve by reason of the position and perforation of the latter, the position thereof being determined by the eccentrics, and a pair of pulleys attached respectively to said eccentrics at the side thereof whereby to regulate the initial angular and relative position of said eccentrics to each other and to determine by the presetting of one of the eccentrics the amount of flow of pressure fluid through said poppet valves before the pressure in the pressure egress passages is relieved through the sleeve perforations by reason of the change in sleeve position induced by the revolution of the second eccentric caused by transmission of motion of the element intended to be moved by the hydraulic pressure back to the eccentrics through rotation of that pulley which was not preset.

6. In a hydraulic valve, a block of generally oblong shape, said block having an open space in the middle of one of the longer sides thereof, passages through said block for hydraulic fluid, said passages being substantially parallel to the sides of said open space, the passages being, in the order of distance from said open space, a drain passage, outlet passages and inlet passages, a sleeve valve extending from said block through the top and bottom of said open space, springs in said sleeve valves urging said valves toward said open space, a double eccentric substantially in the middle of said open space operatively engaging said sleeve valves, said valves extending through said drain passages and said outlet passages, a poppet valve between each inlet passage and each outlet passage, said poppet valve and said sleeve valve being arranged to co-operate to open and to shut off communication between said inlet and outlet passages according to the settings of said eccentric and said sleeves being perforated at substantially their middle to establish drainage from said outlet passages to said drain passage when the eccentric is turned to separate the sleeve valves by a minimum amount.

7. In a hydraulic valve, a generally oblong block having a free space in one of the longer sides thereof, inlet, outlet and drain passages serving the two ends of said block, a spring-pressed sleeve valve extending from said block into said free space from the top and bottom of said space, said sleeve valves having drain perforations, and arranged to slide across said outlet and drain passages, a poppet valve between each of the said inlet and outlet passages, said valve being seatable by incoming high pressure fluid and unseatable by said sleeve valve, a double eccentric operatively disposed across said free space in the side of said block, one part of said eccentric being rotatable within the other part, the inner part thereof cooperating with the outer part so that when both register to produce maximum throw, the poppet valve will be unseated by that sleeve between said poppet valve and the longer sides of said eccentric, and the opposite sleeve can separate from its poppet valve and can register its drain perforations opposite said drain passage, and means connected between the object to be hydraulically moved and the outer part of said eccentric whereby the movement of said object will rotate the outer part of the eccentric to produce equal distribution of throw between the upper and lower sleeves whereby to inactivate the valve and stop movement of the object.

8. In combination, a double acting hydraulic selector valve, a pair of eccentrics operatively engaging said valve, one of the eccentrics being rotatable within the other, a pulley tight to the inner eccentric and loose to the outer one, a second pulley tight to the outer eccentric and loose to the inner one, a servo-hydraulic cylinder, fluid-transmitting operating connections between said cylinder and said valve, a reservoir, drain connections between said cylinder and said reservoir and said valve and said reservoir, an object which is to be moved or actuated, a bell crank operatively attached to each end of said flap, a rod connection operatively disposed between said cylinder and one of said bell cranks, a double, fixed cable connection from the pulley tight to the outer eccentric to the object to be moved and from a manual control to said pulley which is tight to the inner eccentric for presetting the latter whereby to cooperate with said outer eccentric to determine the limit of operation of said valve before de-activation thereof takes place by a balancing of fluid pressures therein.

9. In a reversible selector valve for use in a hydraulic system including a source of fluid pressure, a reversible hydraulic motor and a return fluid reservoir, a valve body having a pair of inlet chambers therein respectively communicating with the fluid pressure source, a pair of ports in said valve body adapted to communicate with said reversible motor, a first pair of valves each respectively adapted to control flow of fluid from one of said inlet chambers to one of said ports, a return passage in said valve body adapted to communicate with said return fluid reservoir, a second pair of valves respectively operable to control return flow from one of said ports to said return passage, means comprising a first eccentric displaceable in either direction from a neutral position relative said valves to actuate respective ones of the first and second valves in related pairs so that fluid may be directed to and from the hydraulic motor and valve body and a second eccentric rotatably positioned within the first eccentric and operable to shift the first eccentric from its neutral position, manually actuated means for displacing the second eccentric and a follow up means responsive to operation of the hydraulic motor for actuating the first eccentric to restore the same to its neutral position relative the valves.

10. A reversible selector valve according to claim 9 in which the first pair of valves are poppet valves and the second pair of valves comprise sleeves concentric with said poppet valves, said sleeves being internally bevelled whereby to cooperate with the coned portion of said poppet valves to form a seperable seal.

11. In a reversible selector valve for use in a hydraulic system for performing work, said system including a source of fluid pressure, a reversible hydraulic motor, a return fluid reservoir, a valve body having a high-pressure inlet, a return passage and hydraulic motor passages therein, a first of said motor passages connecting said inlet a second motor passage connecting with said return passage, a pair of inlet valve means controlling flow from the inlet to the respective motor passages, a pair of exhaust valve means controlling flow from a respective motor passage to said return passage, means comprising a pair of eccentrics of said valve, a first eccentric being revoluble within the second for regulating the amount of high-pressure fluid which may pass through said valve during a single cycle thereof, a pulley attached to the side of each eccentric to rotate therewith, the first pulley and the first eccentric controlling fluid metering means within said valve, the second pulley and the second eccentric being controlled by a load member which is to be hydraulically moved, whereby when the second pulley and second eccentric again coincide with the point to which the first pulley and eccentric were set, a cycle is completed and the valve deactivated.

12. In a reversible selector valve for use in the hydraulic system including a source of fluid pressure, a reversible hydraulic motor and a return fluid reservoir, a valve body, a pair of oppositely disposed passages therein for the ingress of high-pressure fluid, a pair of parallel passages therein for the egress of high-pressure fluid, a common drain passage, a pair of valves of the poppet type for controlling the flow of high-pressure fluid from said ingress passages to said egress passages, a pair of oppositely disposed sleeves attached to contact said poppet valves with an inner open sleeve end, said sleeves being perforated in a zone substantially intermediate of their ends, and means comprising a pair of eccentrics, the inner one being rotatable within the outer one to change the amount of throw of the latter, said eccentric governing the amount of movement of said sleeves whereby to regulate the degree of movement of said valves by pressure relief to the drain passage taking place through the sleeve perforations, and a manual control connected to the inner eccentric, said reversible hydraulic motor being operatively connected to said outer eccentric through the load to be moved.

13. In a reversible selector valve for use in a hydraulic system including a source of fluid pressure, a reversible hydraulic motor and a return fluid reservoir, a valve body dual means in said body for receiving fluid at high pressure, dual means for delivering fluid of high pressure, a common drain passage for fluid at atmospheric pressure, and sealing flow from the first named passages to the second named passages, means for opening said sealing means, said means comprising a pair of slidable sleeves perforated substantially intermediate of their ends, said sleeves being slidably disposed across said second named means to open said sealing means, adjustable means for regulating the limits of travel of said sleeves whereby the amount of fluid passed by the opening of said sealing means may be preselected, said means comprising a pair of inner and outer eccentrics, the inner one being revoluble of the outer one, the latter being in contact with the outer ends of said sleeves, a pulley attached to the side of each eccentric, a driving connection between one eccentric and the object to be hydraulically actuated, said driving means including said reversible hydraulic motor, and acting to bring the eccentric back to its original position whereby to activate the valve, and a manual control acting on the pulley attached to the side of the inner eccentric whereby to preselect the position of the inner eccentric.

14. In a reversible selector valve for use in a hydraulic system including a source of fluid pressure, a reversible hydraulic motor and a return fluid reservoir, hydraulic tubing connections operatively disposed between the aforesaid elements, said reversible selector valve comprising a generally oblong block having an open space of substantial size in the middle of one of its longer sides, a pair of eccentrics positioned one inside the other and located to operate crosswise of said open space, operating valve extending into said open space from the top and bottom thereof, said valves comprising a pair of sleeves, said sleeves having closed ends in contact with the outer one of said eccentrics, a pair of pulleys, a mounting for said pulleys and extension from said block supporting said mounting, each of said pulleys being operatively connected to one of said eccentrics so that the inner eccentric may be rotated inside the outer eccentric whereby to regulate the degree of projection of said valves from said block, operating passages within said block regulatable by the longitudinal position of said valves, and a manual control driving the pulley connected to the inner eccentric, whereby to govern the setting of said inner eccentric, and a driving connection extending from the object to be moved by said motor to the pulley attached to said outer eccentric, whereby to regulate the position of said eccentric which causes the valve to become deactivated.

15. In a reversible selector valve for use in a hydraulic system including a source of fluid pressure, a reversible hydraulic motor and a return fluid reservoir, hydraulic tubing connections operatively disposed between the aforesaid elements, a valve body for said selector valve, in a hydraulic valve, a body, an inlet for high pressure fluid therethrough, a pair of passages from said inlet, a pair of valve chambers to which said passages are connected, said valve chambers being on opposite sides of an opening in said block, a pair of eccentrics mounted in said opening, one eccentric being rotatable within the other, a pair of perforated sleeves, each sleeve having an outer end which is normally in contact with the outer of said eccentrics, and said sleeves being slidable in opposite directions by said eccentric, a poppet valve for each eccentric, said poppet valves being disposed oppositely to each other, a fluid pressure outlet controlled by each poppet valve, a drain passage from each pressure-fluid egress-passage, said drain passage being under the control of said sleeve by reason of the position and perforation of the latter, the position thereof being determined by the eccentrics, and a pair of pulleys attached respectively to said eccentrics at the side thereof whereby to regulate the initial angular and relative position of said eccentrics to each other, a manual control operatively attached to the pulley governing the setting of the inner eccentric and a driving connection between the object to be moved by said motor and the pulley governing the setting of the outer eccentric whereby to deactivate said valve when said outer eccentric pulley has moved to the deactivating position determined by the setting of the inner eccentric.

16. In a reversible selector valve for use in a hydraulic system including a source of fluid pressure, a reversible hydraulic motor, a return fluid reservoir and hydraulic tubing operatively disposed between the aforesaid elements, a valve body which is a block of generally oblong shape, said block having an open space in the middle of one of the longer sides thereof, passages through said block for hydraulic fluid, said passages being substantially parallel to the sides of said open space, the passages being in the order of distance from said open space, a drain passage, outlet passages and inlet passages, a sleeve valve extending from said block through the top and bottom of said open space, springs in said sleeve valves urging said sleeves toward said open space, a double eccentric substantially in the middle of said open space operatively engaging said sleeve valves, said valves extending through said drain passages and said outlet passages, a poppet valve between each inlet passage and each outlet passage, said poppet valve and said sleeve valve being arranged to cooperate to open and to shut off communication between said inlet and outlet passages according to the settings of said eccentric, said sleeves being perforated at substantially of their middle to establish drainage from said outlet passages to said drain passage when the eccentric is turned to operate the sleeve valve by a minimum amount, a pulley attached to each member of said double eccentric, a manual control for regulating the position of that one of said pulleys which is attached to the inner eccentric and consequently the angular setting of said inner eccentric and a driving connection between the pulley attached to the outer eccentric and the object to be moved by said motor, whereby movement of the object to be moved will deactivate the system when the outer eccentric reaches the deactivating position as is determined by the setting of said inner eccentric.

17. In a reversible selector valve for use in the hydraulic system including a source of fluid pressure, a reversible hydraulic motor, a return fluid reservoir and a hydraulic tubing operatively disposed between the aforesaid elements said selector valve comprising a generally oblong block having a free space in one of the longer sides thereof, inlet, outlet and drain passages serving the two ends of said block, the spring-pressed sleeve valve extending from said block into said free space from the top and bottom of said space, said sleeve valves having drain perforations, and arranged to slide across said outlet in drain passages, a poppet valve between each of said inlet and outlet passages, said valve being seatable by incoming high-pressure fluid and unseatable by said sleeve valve, a double eccentric operatively disposed across said free space inside of said block, one part of said eccentric being rotatable within the other part, the inner part thereof cooperating with the outer part so that when both are registered to produce throw, the poppet valve will be unseated by that sleeve between said poppet valve and the longer side of said eccentric, and the opposite sleeve can separate from its poppet valve and can register its drain perforations opposite said drain passage, and means connected between the object which is to be hydraulically moved by said motor and the outer part of said eccentric whereby the movement of said object will rotate the outer part of the eccentric to produce equal distribution of throw between the upper and lower sleeves whereby to inactivate the valve and stop movement of the object, and a manual control operatively connected to the inner part of the eccentric to determine the location of the point of maximum throw occurring when said outer part of said eccentric is rotated.

JAMES F. SPIELMAN.

REFERENCES CITED

The following references are of record in the file of this patent:

UNITED STATES PATENTS

| Number | Name | Date |
| --- | --- | --- |
| 1,314,153 | Schneider | Aug. 26, 1919 |
| 1,645,751 | Graffinberger | Oct. 18, 1927 |
| 2,333,670 | Parker | Nov. 9, 1943 |
| 2,404,552 | Werff | July 23, 1946 |

FOREIGN PATENTS

| Number | Country | Date |
| --- | --- | --- |
| 10,740 | Great Britain | July 25, 1888 |
| 387,567 | Great Britain | Feb. 9, 1933 |